US012225346B2

(12) United States Patent
Lee

(10) Patent No.: US 12,225,346 B2
(45) Date of Patent: Feb. 11, 2025

(54) MULTIPLE-DRIVER ADAPTER HAVING PLANE WAVE EQUALIZER

(71) Applicant: Jong Bae Lee, Seoul (KR)

(72) Inventor: Jong Bae Lee, Seoul (KR)

( * ) Notice: Subject to any disclaimer, the term of this patent is extended or adjusted under 35 U.S.C. 154(b) by 0 days.

(21) Appl. No.: 18/020,630

(22) PCT Filed: Jan. 31, 2023

(86) PCT No.: PCT/KR2023/001390
§ 371 (c)(1),
(2) Date: Feb. 10, 2023

(87) PCT Pub. No.: WO2024/162489
PCT Pub. Date: Aug. 8, 2024

(65) Prior Publication Data

US 2024/0284098 A1 Aug. 22, 2024

(51) Int. Cl.
*H04R 25/00* (2006.01)
*H04R 1/28* (2006.01)
*H04R 1/30* (2006.01)
*H04R 1/34* (2006.01)

(52) U.S. Cl.
CPC ............. *H04R 1/30* (2013.01); *H04R 1/2811* (2013.01); *H04R 1/345* (2013.01); *H04R 2201/34* (2013.01)

(58) Field of Classification Search
USPC .......................................................... 381/340
See application file for complete search history.

(56) References Cited

U.S. PATENT DOCUMENTS

2015/0289050 A1* 10/2015 Butler .................... H04R 1/403 381/387

FOREIGN PATENT DOCUMENTS

CN 107925812 A * 4/2018 ............... H04R 1/24
EP 0158978 A2 * 10/1985

OTHER PUBLICATIONS

EP-0158978-A1. Translation (Year: 1985).*
CN-107925812-A. Translation. (Year: 2018).*

* cited by examiner

*Primary Examiner* — Phylesha Dabney
(74) *Attorney, Agent, or Firm* — Revolution IP, PLLC

(57) ABSTRACT

A multiple-driver adapter having a plane wave equalizer according to the present invention may include: a cube body; a high-pitched driver provided on one surface of the cube body and a medium-pitched driver provided on the other surface; a horn unit vertically disposed in the high-pitched driver and the medium-pitched driver, and partially disposed at output units of the high-pitched and medium-pitched drivers, and having a fore end exposed to one surface of the cube body; and at least one equalizer provided in the cube body and reducing sound interference.

8 Claims, 5 Drawing Sheets

MULTIPLE-DRIVER ADAPTER HAVING PLANE WAVE EQUALIZER

TECHNICAL FIELD

The present invention relates to a multiple-driver adapter having a plane wave equalizer, and more particularly, to a multiple-driver adapter having a plane wave equalizer which radiates different sound sources generated through high-pitched and medium-pitched drivers with multiple equalizers to reduce sound interference, enhance a sound balance as compared with a concentric axis, and minimize a phase difference.

BACKGROUND ART

In general, a speaker which plays a sound by converting electrical energy into physical energy is a device that converts the electrical energy into mechanical energy by a voice coil which exists between voids according to the left-hand rule of Fleming that a conductor with a current is in a magnetic field, a force is received.

In other words, in the speaker, when current signals having various ranges of frequencies are applied to the voice coil, the voice coil generates the mechanical energy according to a current intensity and a frequency magnitude and vibrates a vibration plate coupled to the voice coil to generate a sound.

In a concert hall, such as a concert hall, a line speaker system which is a large speaker that connects multiple speakers in a series in one direction (e.g., in a vertical direction) is used to maximize a performance effect. In a speaker or a speaker system constituted by consecutively arranging multiple speakers, a method for increasing a sound pressure is used in order to send the sound far away, and a horn-type speaker (hereinafter, referred to as "horn speaker") is generally used in order to implement the method. The horn speaker is constituted by a horn and a compression driver. The compression driver is implemented to reduce air resistance to implement a high sound pressure when the vibration plate moves.

However, a volume of the horn speaker is increased due to a shape of the horn and an arrangement relationship with the compression driver, so it may be difficult to minimize the horn speaker, and a single sound source is output by a single horn, so the number of horn speakers increases proportionally when outputting multiple sound sources, and as a result, there is a problem in that a spatial constraint is aggravated.

Further, when the volume is reduced by overlapping multiple drivers, the sound is offset due to mutual sound interference, so a directivity is deteriorated and the sound balance is broken due to a phase difference, and a sound balance is deteriorated as compared with a concentric axis.

DISCLOSURE

Technical Problem

A technical object to be achieved by the present invention is to provide a multiple-driver adapter having a plane wave equalizer in which a horn speaker structure securing a directivity is maintained, and multiple drivers are arranged to face each other on both side surfaces of a cube body, and a main equalizer is disposed vertical thereto, and the horn speaker is miniaturized, while a sound pressure may bee enhanced, and high-sound and medium-sound sub-equalizers are provided to reduce sound interference and offset and enhance a directivity, and a phase difference is minimized to enhance a sound balance and achieve a sound balance which is more excellent than a concentric axis.

Technical Solution

In order to solve the problem, a multiple-driver adapter having a plane wave equalizer according to the present invention may include: a cube body: a high-pitched driver provided on one surface of the cube body and a medium-pitched driver provided on the other surface: a horn unit vertically disposed in the high-pitched driver and the medium-pitched driver, and partially disposed at output units of the high-pitched and medium-pitched drivers, and having a fore end exposed to one surface of the cube body; and at least one equalizer provided in the cube body and reducing sound interference.

The equalizer may be provided in each of the high-pitched driver, the medium-pitched driver, and the horn unit.

The equalizer may include a main equalizer provided in the horn unit, a first sub-equalizer provided at the center of the high-pitched driver, and a second sub-equalizer provided at the center of the medium-pitched driver.

The first sub-equalizer and the second sub-equalizer may be provided to face each other in a central direction of the cube body, and the main equalizer may be provided to vertically intersect with the first and second sub-equalizers, and disposed in an outer direction of the cube body.

A shortest distance from a frontmost end of the first sub-equalizer to the main equalizer may be relatively shorter than a shortest distance from the frontmost end of the second sub-equalizer to the main equalizer.

Inner diameters of a tube expansion unit and a communication hole of the high-pitched driver may be relatively smaller than inner diameters of the tube expansion unit and the communication hole of the medium-pitched driver.

An inclination angle of the tube expansion unit of the high-pitched driver may be gentler than an inclination angle of the medium-pitched driver.

The main equalizer, and the first and second sub-equalizers may be provided in a conical shape.

Advantageous Effects

According to the present invention, in a multiple-driver adapter having a plane wave equalizer, a horn speaker structure securing a directivity is maintained, and multiple drivers are arranged to face each other on both side surfaces of a cube body, and a main equalizer is disposed vertical thereto, and the horn speaker is miniaturized, while a sound pressure may be enhanced, and high-sound and medium-sound sub-equalizers are provided to reduce sound interference and offset and enhance a directivity, and a phase difference is minimized to enhance a sound balance and achieve a sound balance which is more excellent than a concentric axis.

MODE FOR THE INVENTION

Figure 1:
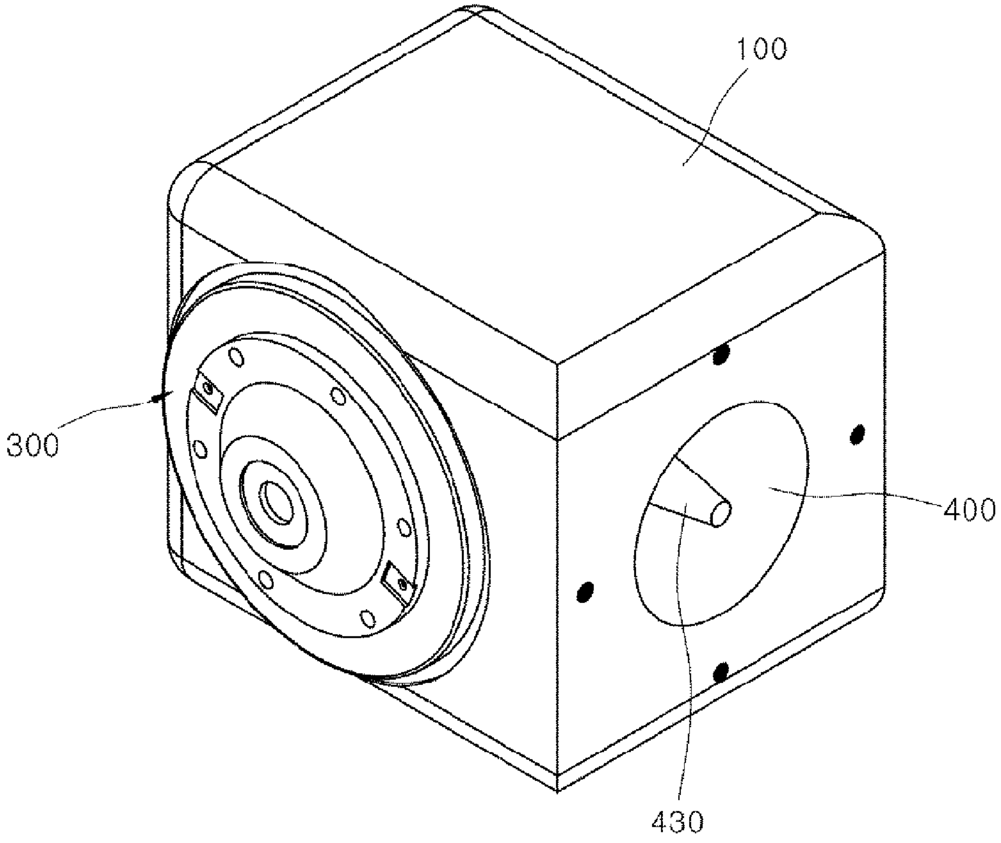
FIG. 1 is a perspective view of a multiple-driver adapter having a plane wave equalizer according to an embodiment of the present invention.

For embodiments according to the concept of the present invention disclosed herein, specific structural or functional explanations are exemplified for describing embodiments according to the concept of the present invention, and the embodiments according to the concept of the present invention may be implemented as various forms, and are not limited to the embodiments described herein.

The embodiments of the concept of the present invention may have various modifications and various forms and the embodiments will be illustrated in the drawings and described in detail herein. However, this does not limit the embodiments according to the concept of the present invention to specific embodiments, and the present invention covers all the modifications, equivalents and replacements included within the idea and technical scope of the present invention.

Hereinafter, an embodiment of a multiple-driver adapter having a plane wave equalizer according to the present invention will be described in detail with reference to the accompanying drawings.

Figure 2:
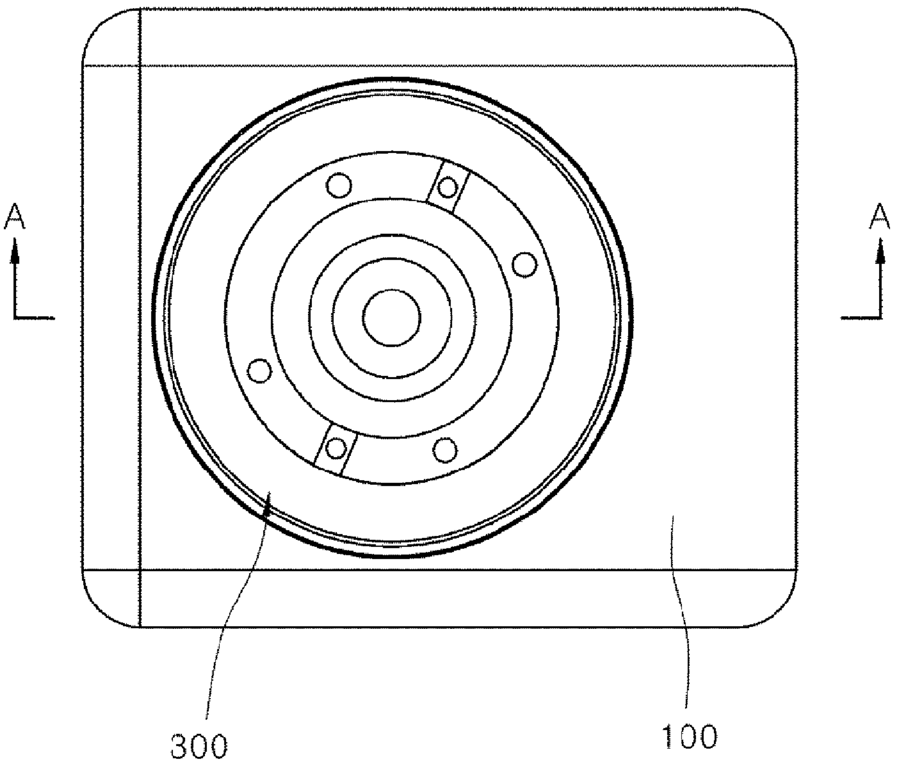
FIG. 2 is a front view of the multiple-driver adapter having a plane wave equalizer according to an embodiment of the present invention.
Figure 3:
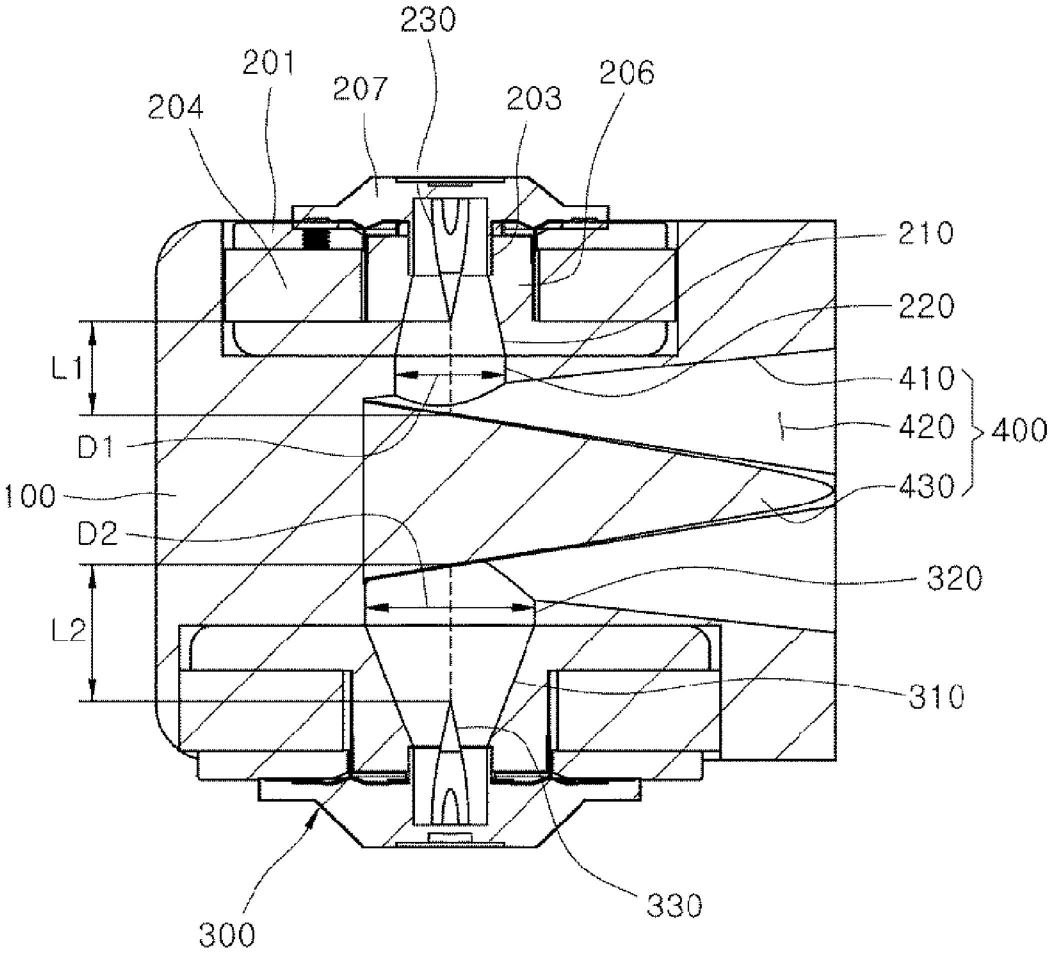
FIG. 3 is a cross-sectional view of line A-A of FIG. 2.
Figure 4:
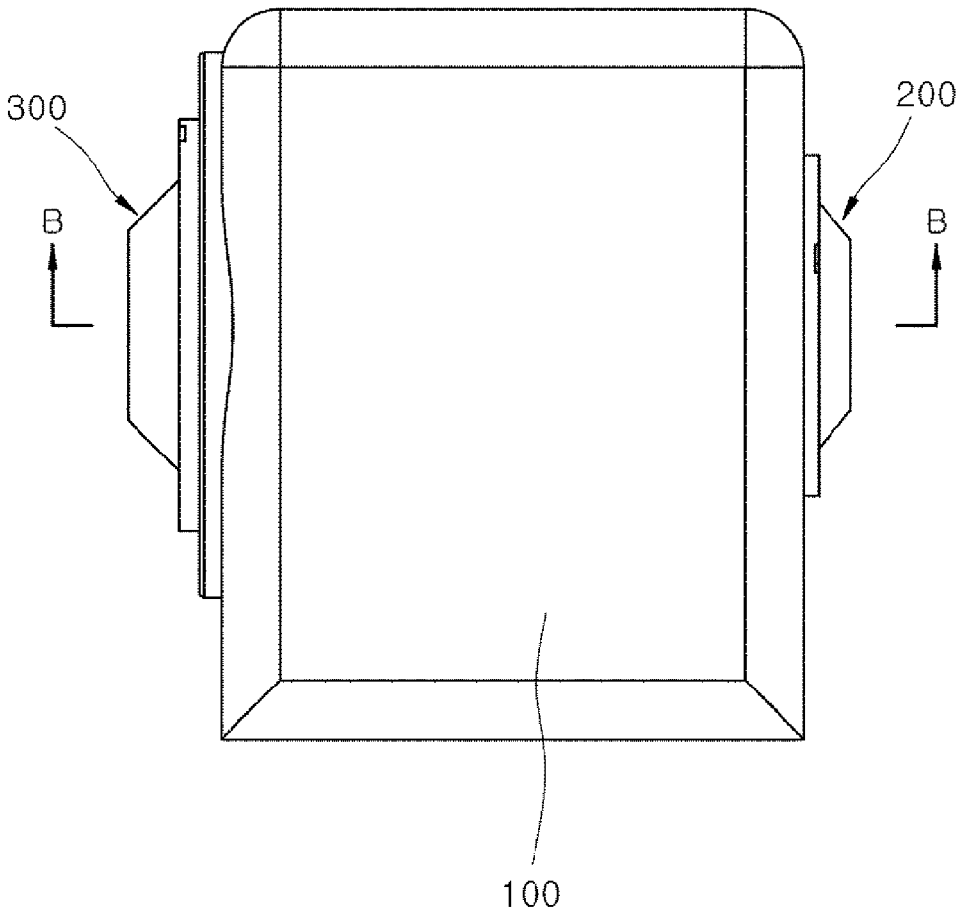
FIG. 4 is a top view of the multiple-driver adapter having a plane wave equalizer according to an embodiment of the present invention.
Figure 5:
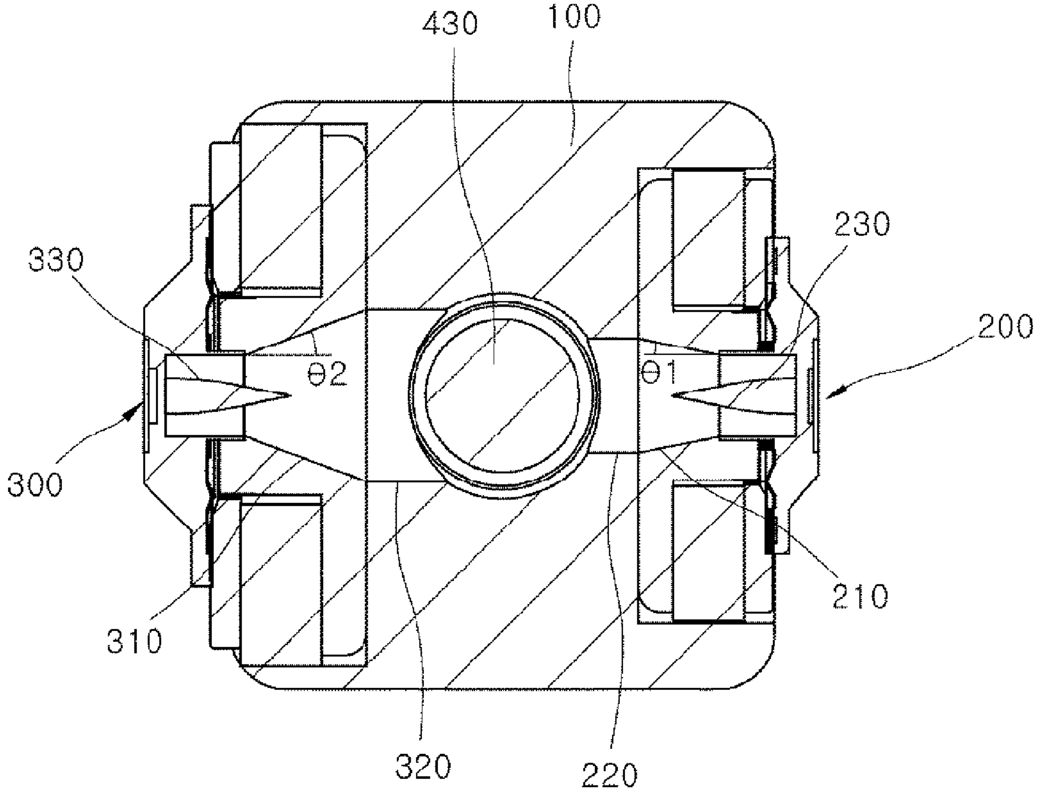
FIG. 5 is a cross-sectional view of line B-B of FIG. 4.

FIG. 1 is a perspective view of a multiple-driver adapter having a plane wave equalizer according to an embodiment of the present invention, FIG. 2 is a front view of the multiple-driver adapter having a plane wave equalizer according to an embodiment of the present invention, FIG. 3 is a cross-sectional view of line A-A of FIG. 2, FIG. 4 is a top view of the multiple-driver adapter having a plane wave equalizer according to an embodiment of the present invention, and FIG. 5 is a cross-sectional view of line B-B of FIG. 4.

The multiple-driver adapter having a plane wave equalizer according to an embodiment of the present invention may include a cube body 100, a high-pitched driver 200 provided on one surface of the cube body 100 and a medium-pitched driver 300 provided on the other surface, a horn unit which is vertically disposed in the high-pitched driver 200 and the medium-pitched driver 300, and partially disposed at output units of the high-pitched and medium-pitched drivers 200 and 300, and has a front end exposed to one surface of the cube body 10, and one or more equalizers 230, 330, and 430 provided in the cube body 100 and reducing sound interference.

The cube body 100 may be provided as a rectangular cube type. Multiple drivers are coupled to the cube body 100, while the cube body 100 may be provided to have a size to accommodate a horn unit 400 having a comparatively long size. Instead, the horn unit 400 is provided to be completely accommodated in the cube body 100 to be easily miniaturized.

The high-pitched driver 200 may be coupled to one surface of the cube body 100.

When the structure of the high-pitched driver 200 is simply described, a plate 204 may be provided as illustrated in FIG. 3, and the plate 204 may have a through hole into which a voice coil 202 may be inserted and reciprocated.

A magnet 201 may be provided on one surface (a top surface based on FIG. 3) of the plate 204 and provided to interact with the voice coil 202, and a pole piece 203 is formed to protrude at the center, and while the voice coil 202 is fitted into an outer side of the pole piece 203, the voice coil 202 may be coupled to the vibration plate 206 by penetrating the through hole of the plate 204.

A tube expansion unit 210 may be provided at the center of the vibration plate 206, and the high-pitched sound passing through the tube expansion unit 210 may enter a horn unit 400 via a communication hole 220.

In addition, a first sub-equalizer 230 may be provided inside the pole piece 203. Here, the first sub-equalizer 230 may be supported on a cover.

Similarly, the medium-pitched driver 300 has substantially the same structure as the high-pitched driver 200. However, the high-pitched driver 200 provided on one surface of the cube body 100 is provided on the other surface of the cube body 100, so respective drivers may be disposed to face each other. A second sub-equalizer 330 may be provided even in the medium-pitched driver 300, and the tube expansion unit 210 and the communication hole 320 may be provided on an output unit.

As such, multiple drivers are disposed to face both side surfaces of the cube body 100 to be easily miniaturized.

The horn unit 400 has a cylindrical structure provided radially, and may be provided to have an internal space of which cross-sectional shape is an inverted trapezoidal shape or an inverse conical shape. A main equalizer 430 may be disposed along an axial center of the horn unit 400. The horn unit 400 is interposed between the high-pitched driver 200 and the medium-pitched driver 300, and vertically disposed, so the device may be easily miniaturized.

Meanwhile, when the volume is reduced by overlapping multiple drivers 200 and 300, the sound is offset due to mutual sound interference, so a directivity is deteriorated and the sound balance is broken due to a phase difference, and a sound balance is deteriorated as compared with a concentric axis.

Therefore, in the embodiment, at least one equalizer may be provided inside the cube body 100. The equalizer may be provided in each of the high-pitched driver 200, the medium-pitched driver 300, and the horn unit 400.

The equalizer may include the main equalizer 430 provided in the horn unit 400, the first sub-equalizer 230 provided at the center of the high-pitched driver 200, and the second sub-equalizer 330 provided at the center of the medium-pitched driver 300.

The main equalizer 430 may be provided at the center of the horn unit 400. The main equalizer 430 is provide in a conical shape, and high-pitched and medium-pitched sound sources output through the respective communication holes 220 and 320 are not mutually interfered, but may be output to the outside.

The first sub-equalizer 230 may be provided in the high-pitched driver 200, and the second sub-equalizer may be provided in the medium-pitched driver 300. The first and second sub-equalizers 230 and 330 may be provided in the conical shape, similarly to the main equalizer 430, and serve to interrupt a primary interference phenomenon in the sound sources generated by the respective drivers 200 and 300.

The first sub-equalizer 230 and the second sub-equalizer 330 may be provided to face each other in a central direction of the cube body 100, and the main equalizer 430 may be provided to vertically intersect with the first and second sub-equalizer 230 and 330, and disposed in an outer direction of the cub body 100.

A shortest distance L1 from a frontmost end of the first sub-equalizer 230 to the main equalizer 430 may be relatively shorter than a shortest distance L2 from the frontmost end of the second sub-equalizer 330 to the main equalizer 430. As a result, an interference phenomenon between sound sources according to a frequency band may be minimized, and an offset phenomenon may also be reduced.

An inner diameter D1 of the communication hole of the high-pitched driver 200 may be relatively smaller than an inner diameter D2 of the communication hole of the medium-pitched driver 300.

An inclination angle θ1 of the tube expansion unit of the high-pitched driver 200 may be gentler than an inclination angle θ2 of the medium-pitched driver 300.

Due to a shape structure such as a relative ratio the shortest distance, an inner diameter ratio, a relative ratio of the inclination angle, etc., the sound interference and the offset are reduced to enhance the directivity and minimize the phase difference.

That is, occurrence of the interference phenomenon may be prevented at a portion where the high-pitched and medium-pitched sound sources transferred through the high-pitched driver 200 and the medium-pitched driver 300, respectively are overlapped at the time of reaching the main equalizer 430, and the sound forms a substantial plane wave on an outer surface of the cube body 100 via the horn unit 400 by the interaction of the main equalizer 430 to significantly increase a transfer distance and a transfer range of the sound. Consequently, the sound interference phenomenon is maximally suppressed and the directivity is maximized, and as a result, the sound may be significantly sufficiently well transferred regardless of a location of an audience even in a venue.

As described above, a horn speaker structure securing a directivity is maintained, and multiple drivers 200 and 300 are arranged to face each other on both side surfaces of the cube, and the main equalizer 430 is disposed vertical thereto, and the horn speaker is miniaturized, while a sound pressure may bee enhanced, and high-sound and medium-sound sub-equalizers 230 and 330 are provided to reduce sound interference and offset and enhance a directivity, and a phase difference is minimized to enhance a sound balance and achieve a sound balance which is more excellent than a concentric axis.

Hereinabove, the present invention is described in detail by using a preferred embodiment, but the scope of the present invention is not limited to a specific embodiment, and will be interpreted by the appended claims. Further, those who acquire normal knowledge in this technical field will appreciate that a lot of modifications and changes can be made without departing from the scope of the present invention.

INDUSTRIAL APPLICABILITY

The present invention relates to a multiple-driver adapter having a plane wave equalizer which radiates different sound sources generated through high-pitched and medium-pitched drivers with multiple equalizers to reduce sound interference, enhance a sound balance as compared with a concentric axis, and minimize a phase difference, and has an industrial applicability.

The invention claimed is:

1. A multiple-driver adapter having a plane wave equalizer, comprising:
- a cube body;
- a high-pitched driver provided on one surface of the cube body and a medium-pitched driver provided on the other surface;
- a horn unit vertically disposed in the high-pitched driver and the medium-pitched driver, and partially disposed at output units of the high-pitched and medium-pitched drivers, and having a fore end exposed to one surface of the cube body; and
- at least one equalizer provided in the cube body and reducing sound interference.

2. The multiple-driver adapter having a plane wave equalizer of claim 1, wherein the equalizer is provided in each of the high-pitched driver, the medium-pitched driver, and the horn unit.

3. The multiple-driver adapter having a plane wave equalizer of claim 2, wherein the equalizer includes
- a main equalizer provided in the horn unit,
- a first sub-equalizer provided at the center of the high-pitched driver, and
- a second sub-equalizer provided at the center of the medium-pitched driver.

4. The multiple-driver adapter having a plane wave equalizer of claim 3, wherein the first sub-equalizer and the second sub-equalizer are provided to face each other in a central direction of the cube body, and
- the main equalizer is provided to vertically intersect with the first and second sub-equalizers, and disposed in an outer direction of the cube body.

5. The multiple-driver adapter having a plane wave equalizer of claim 3, wherein a shortest distance from a frontmost end of the first sub-equalizer to the main equalizer is relatively shorter than a shortest distance from the frontmost end of the second sub-equalizer to the main equalizer.

6. The multiple-driver adapter having a plane wave equalizer of claim 3, wherein inner diameters of a tube expansion unit and a communication hole of the high-pitched driver are relatively smaller than inner diameters of the tube expansion unit and the communication hole of the medium-pitched driver.

7. The multiple-driver adapter having a plane wave equalizer of claim 3, wherein an inclination angle of the tube expansion unit of the high-pitched driver is gentler than an inclination angle of the medium-pitched driver.

8. The multiple-driver adapter having a plane wave equalizer of claim 3, wherein the main equalizer, and the first and second sub-equalizers are provided in a conical shape.

* * * * *